United States Patent
Lynch (10) Patent No.: US 8,752,341 B2
(45) Date of Patent: *Jun. 17, 2014

(54) WILDLIFE FLASHOVER PREVENTER FOR HIGH VOLTAGE ELECTRICAL TRANSMISSION STRUCTURES

(75) Inventor: Michael Lynch, Reno, NV (US)

(73) Assignee: Eco Electrical Systems, Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 13/554,797

(22) Filed: Jul. 20, 2012

(65) Prior Publication Data

US 2012/0279778 A1 Nov. 8, 2012

Related U.S. Application Data

(63) Continuation of application No. 12/395,580, filed on Feb. 27, 2009, now Pat. No. 8,225,558.

(51) Int. Cl.
*E04B 1/72* (2006.01)
*H02G 7/00* (2006.01)
*E04H 9/16* (2006.01)

(52) U.S. Cl.
USPC .......... 52/101; 52/12; 119/903; 174/5 R; 174/5 SB (58) Field of Classification Search
USPC ........ 43/58, 124; 52/12, 13, 101, 147, 152, 52/287.1, 288.1; 119/61.3, 174, 537, 903; 174/5 R, 5 SG, 137 R, 138 F, 138 G, 174/138 R, 169; 248/124.2, 218.4, 219.4, 248/227.3, 227.4, 229.1, 229.16, 300
See application file for complete search history.

(56) References Cited

U.S. PATENT DOCUMENTS

| | | | |
|---|---|---|---|
| 873,353 A | 12/1907 | Dixon | |
| 1,177,867 A * | 4/1916 | Johnson | 174/139 |
| 1,836,572 A | 12/1931 | Briney | |
| 1,847,460 A | 3/1932 | Austin | |
| 1,939,964 A * | 12/1933 | Fleming | 174/45 R |
| 2,302,759 A | 11/1942 | Gibson | |
| 2,682,591 A | 6/1954 | Killian | |
| 3,270,120 A * | 8/1966 | Van et al. | 174/1 |
| 3,459,870 A | 8/1969 | Plummer | |
| 3,782,059 A | 1/1974 | Reed | |
| 3,892,910 A * | 7/1975 | Smith | 174/37 |

(Continued)

FOREIGN PATENT DOCUMENTS

JP 06089626 A * 3/1994 ........... H01B 17/46

*Primary Examiner* — Charles A Fox
*Assistant Examiner* — Joseph J Sadlon
(74) *Attorney, Agent, or Firm* — Patent Law Group LLP; Brian D Ogonowsky (57) ABSTRACT

A conventional grounded steel tower, or other structure, supports multiple wires (e.g., 6) carrying multi-phase high voltage electricity (e.g., >100 kV). Each wire is supported by a ceramic insulator connected to a horizontal arm of the structure, where an angled strut helps support the arm. There are usually three tiers of wires. The closest distance between a wire and ground is typically between the wire and an angled strut below the wire, where the angled strut helps support a lower-tier wire. A guard formed of a dielectric is affixed to and covers the lower portion of the steel strut as well as any steel that outward extends beyond the strut. The guard prevents flashover between a wire and the underlying grounded strut if a large bird perches on the guard, since the bird will not be grounded by the strut.

18 Claims, 6 Drawing Sheets

(56) References Cited

U.S. PATENT DOCUMENTS

| | | | |
|---|---|---|---|
| 3,911,632 A * | 10/1975 | Bryfogle et al. | 52/13 |
| 3,926,141 A | 12/1975 | Taylor | |
| 4,234,753 A | 11/1980 | Clutter | |
| 4,638,611 A | 1/1987 | Vaughn | |
| 4,713,923 A * | 12/1987 | Sielaff et al. | 52/713 |
| 5,515,656 A | 5/1996 | Mihalich | |
| 5,649,565 A * | 7/1997 | Mulla | 137/343 |
| 5,873,324 A | 2/1999 | Kaddas et al. | |
| 6,378,768 B1 * | 4/2002 | Belloise | 232/39 |
| 6,415,575 B1 * | 7/2002 | Thompson | 52/712 |
| 6,730,852 B1 * | 5/2004 | Puigcerver et al. | 174/138 F |
| 7,009,102 B2 * | 3/2006 | Milner | 174/5 R |
| 7,020,995 B1 | 4/2006 | Snow | |
| 7,137,608 B2 | 11/2006 | Willey | |
| 7,154,036 B2 * | 12/2006 | Lynch | 174/5 R |
| 7,219,863 B1 * | 5/2007 | Collett, II | 248/68.1 |
| 7,297,869 B2 * | 11/2007 | Hiller et al. | 174/40 R |
| 7,490,600 B2 * | 2/2009 | Kopp | 126/82 |
| 7,597,296 B2 * | 10/2009 | Conway | 248/229.16 |
| 7,603,816 B1 * | 10/2009 | Hohmann, Jr. | 52/101 |
| 7,891,141 B2 * | 2/2011 | Kennedy | 52/11 |
| 8,276,498 B1 * | 10/2012 | Hannibal et al. | 89/36.07 |
| 2002/0073633 A1 | 6/2002 | Schlichting et al. | |
| 2002/0117313 A1 * | 8/2002 | Spencer | 174/5 R |
| 2003/0015635 A1 * | 1/2003 | Perrault et al. | 248/218.4 |
| 2006/0003622 A1 | 1/2006 | Lynch | |
| 2007/0044394 A1 | 3/2007 | Grubish et al. | |

* cited by examiner

WILDLIFE FLASHOVER PREVENTER FOR HIGH VOLTAGE ELECTRICAL TRANSMISSION STRUCTURES

CROSS-REFERENCE TO RELATED APPLICATIONS

This is a continuation of U.S. application Ser. No. 12/395,580, entitled Wildlife Flashover Preventer for High Voltage Electrical Transmission Structures, now U.S. Pat. No. 8,225,558, filed on Feb. 27, 2009, incorporated herein by reference.

FIELD OF THE INVENTION

This invention relates to a wildlife insulating cover for use on high voltage electrical transmission structures, where the cover prevents flashovers caused by birds completing a circuit between an energized conductor and the grounded structure.

BACKGROUND

Figure 1:
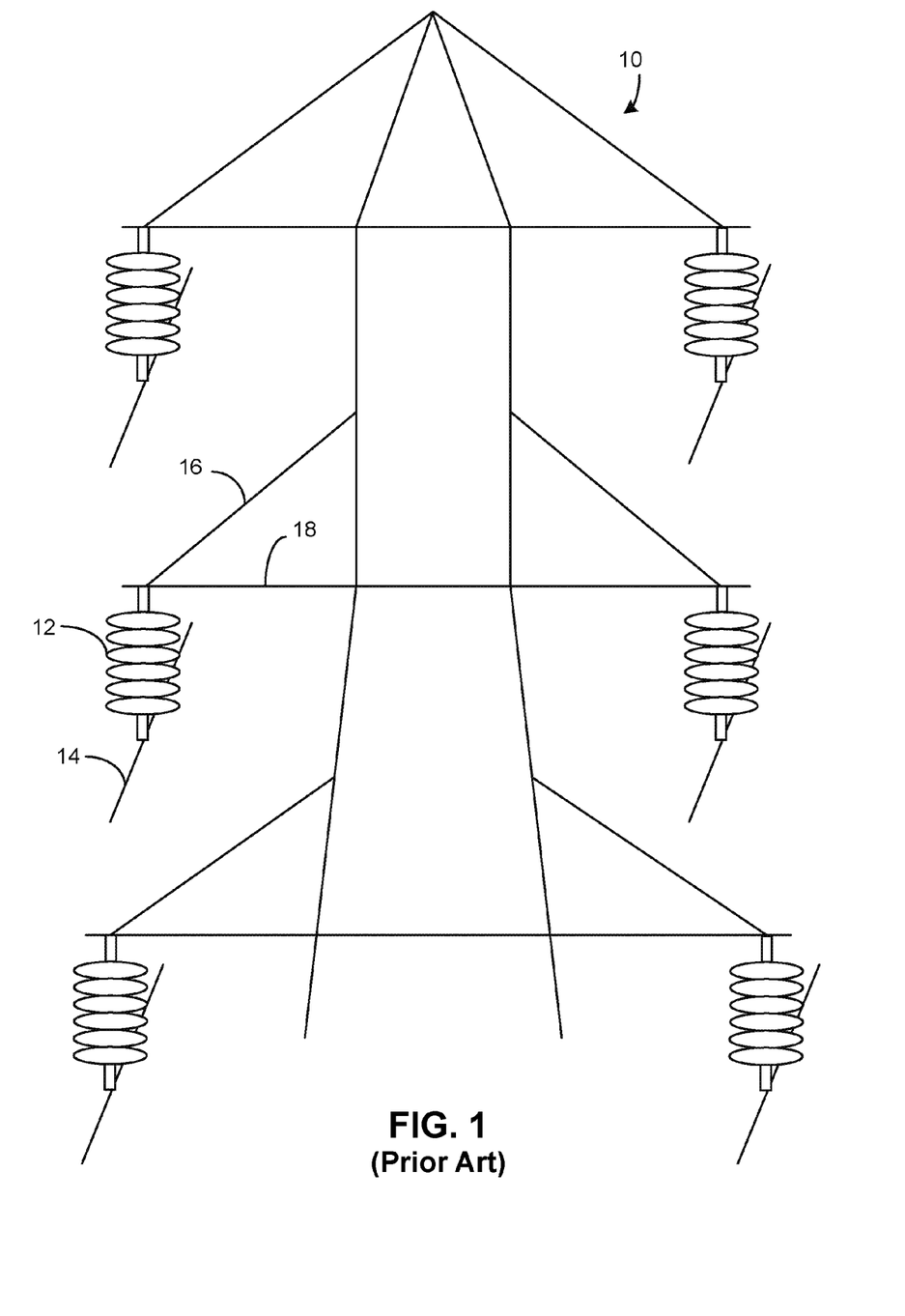
FIG. 1 is a schematic view of the top portion of a steel structure that is typically used to support multi-phase, high voltage distribution wires.

Large steel towers are typically used to support wires carrying high voltages, such as greater than 100 kV. Other structures include those formed of cement or wood. The voltage is typically 3-phase, and at least three wires are supported. FIG. 1 illustrates the top portion of such a tower 10. The tower 10 is grounded by being imbedded in the ground.

Ceramic insulators 12 support the wires 14. The minimum distance between any wire 14 and the tower 10, or between any two wires, is determined by the IEEE National Electric Safety Code. The code takes into account the peak voltage differential, the environment, the type of insulation used, and other factors to set a minimum distance to prevent arcing under expected conditions.

However, when a large bird lands between a wire and the tower, the bird shortens the effective distance between the wire and the tower, and an arc (also referred to as flashover) may result, creating a short circuit through the bird, which trips a circuit breaker in the distribution system. The bird is, of course, killed.

Various techniques have been used to make the steel tower angled struts 16 and horizontal struts 18 less appealing to a bird, such as by affixing a strip of needles or thin spikes along the struts and arms. Large birds have been known to be injured by the needles and spikes when trying to land on them due to the high speed and momentum of the birds when landing.

It is also known to provide an insulating plastic shield over and along the wire near the insulator 12 that extends a few feet along the wire in both directions. However, the bird may still alight on the grounded tower and create a short circuit with the wire above it. Also, the plastic shields attached to the wires have a large surface area and act to push the wires (and ceramic insulators) closer to the tower under high winds. Further, the wires have to be de-energized in order for the lineman to install the shields over the wires.

SUMMARY OF THE INVENTION

The invention prevents a short circuit in an electrical circuit when another conducting material, such as a bird, allows current to flow along a path different from the one intended. The bird shorting the electrical circuit results in a flashover between the bird bridging the air gap between a grounded structure and a high voltage wire above the bird. The term structure includes steel towers, cement structures, wooden structures, and other grounded structures that support high voltage wires.

A plastic guard is affixed over a lower portion of an angled strut of a grounded structure that helps support a ceramic insulator. The plastic guard is constructed to not enable birds to easily grab or perch onto it. The guard has an angled shape to cover the angled strut and, in some embodiments, includes an extending bottom portion that covers the end of the steel horizontal arm of the structure supporting the ceramic insulator. The bottom portion of the guard prevents a bird landing on the steel arm directly above the ceramic insulator. This bottom portion may be wider than the upper portion of the guard. The bottom portion of the guard may be horizontal, or may be angled and raised above the top surface of the upper angled portion to extend over the end of the horizontal strut of the structure.

If a bird perches on the guard, the bird will not be grounded by the structure, so the effective flashover distance between the bird and the grounded structure has been extended by the surface distance of the guard between the bird and the grounded structure. This additional flashover distance can be made any distance appropriate for the circuit voltage to prevent flashover. The guard is constructed of an insulating material having a thickness and other dielectric characteristics needed to prevent flashover between a large bird perched on the guard and the wire above the bird or a bird bridging the air gap between the guard and the wire.

The guard is fitted with attachment bolts or another securing device to affix it to the angled steel struts. In one embodiment, the lower attachment is a snap pin that allows the guard to be loosely attached to the angled strut by a lineman near the body of the tower. Then, the guard is slid down the angled strut to where the guard makes contact with the horizontal strut supporting the insulator and stops. Then, the lineman connects a machine bolt through the guard end nearest the tower body to firmly affix the guard to the angled strut. In this way, the lineman does not have to go near the insulator supporting the wire, and lineman safety is assured Since the guard insulates the bird from ground, rather than from the wire, and the guard is not inviting to a bird due to its smooth, angled, and relatively wide construction, there is less or no need to provide a large shield along the wire. Further, the guard on the strut may be installed without de-energizing the circuit.

BRIEF DESCRIPTION OF THE DRAWINGS

Elements in the various figures labeled with the same numeral are the same or similar.

DETAILED DESCRIPTION

Figure 2:
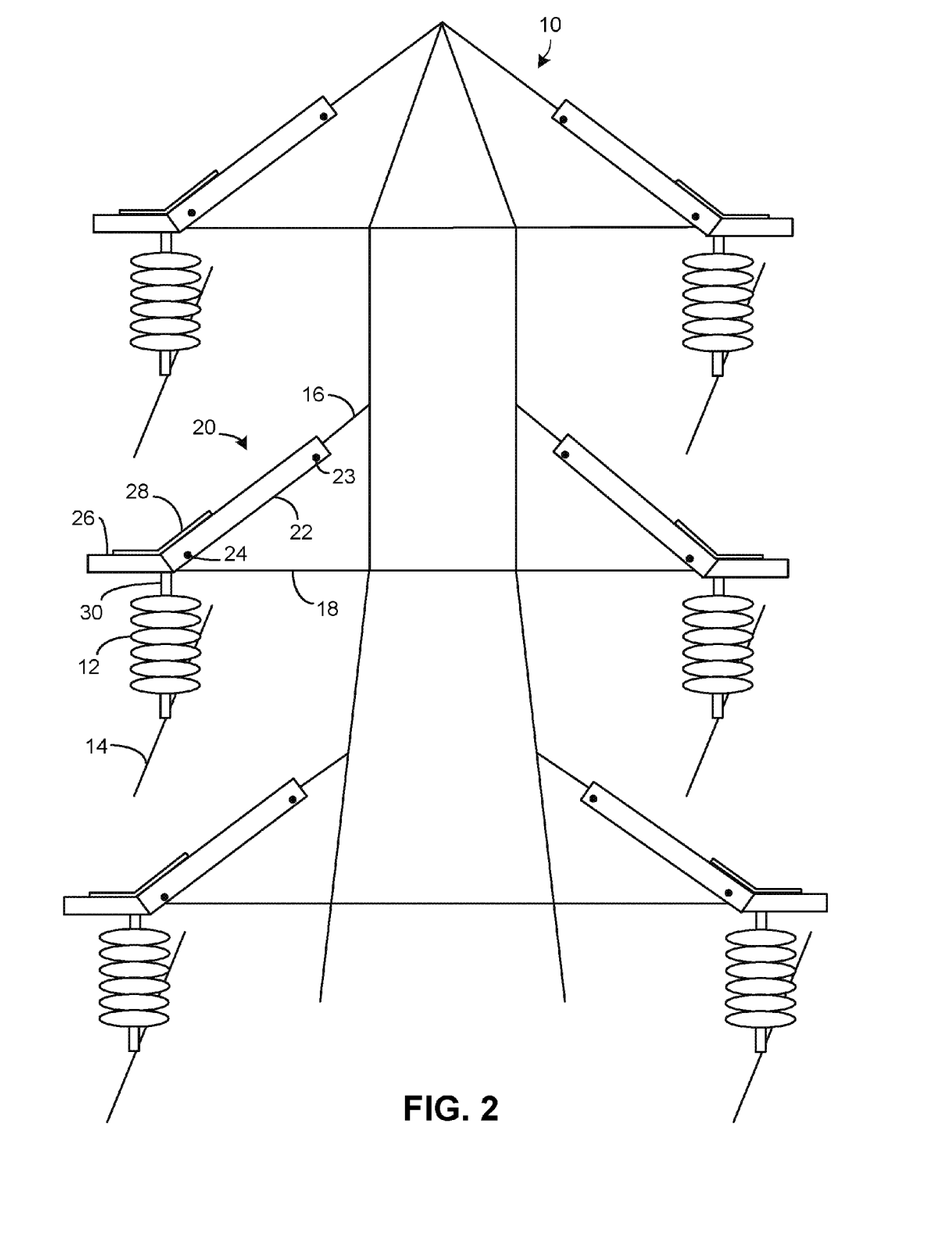
FIG. 2 illustrates the structure of FIG. 1 with the insulating guards affixed over the lower portion of the angled struts.

FIG. 2 illustrates the grounded steel structure of FIG. 1 but with the inventive insulating guards 20 affixed over the angled struts 16. Although two guards 20 are shown on the topmost struts 16, this is optional since any flashover due to a bird landing on a strut 16 will be due to the top of the bird closing the gap between the grounded structure and an overhead wire 14. Therefore, the guards 20 are primarily for use on the lower four struts 16.

A hawk may have a wing span of seven feet. When a bird is taking off or landing, even though not contacting the guard, the guard 20 still acts to prevent flashover, since any flashover must travel around the outer surface of the guard 20 to the grounded structure. This is because the dielectric strength of the guard 20 material is many times that of air, and the air around the guard 20 will break down before the guard 20 material will break down. The guard 20 surface distance between a likely perching spot on the guard 20 and the grounded structure will typically be greater than 12 inches.

Figure 3:
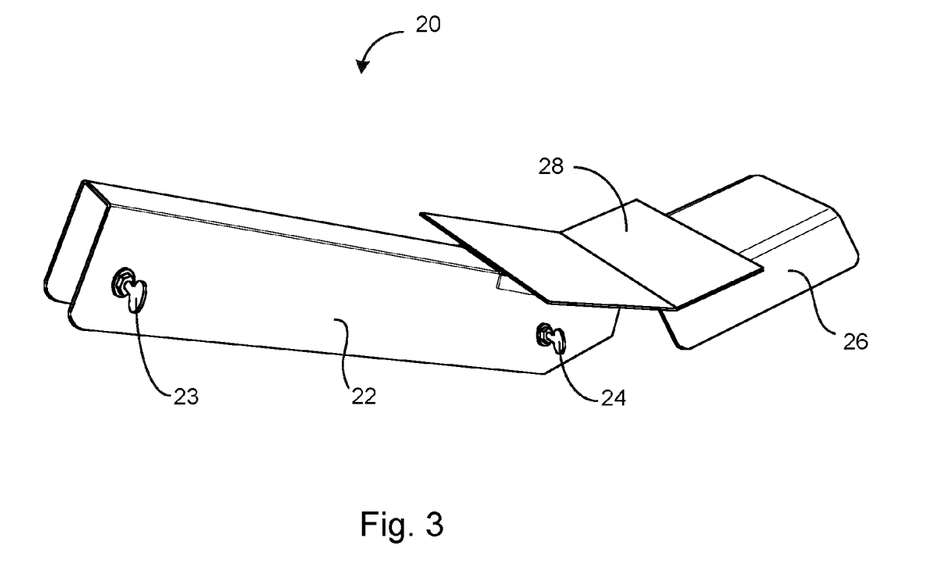
FIG. 3 is a perspective view of the insulating guard shown in FIG. 2.

FIG. 3 is a perspective view of a single guard 20. The guard 20 is formed of a sheet of plastic that is cut and bent in the shape shown using conventional techniques. Alternatively, the guard 20 may be molded. The plastic is of a type that has well-defined dielectric characteristics and long life outdoors. In one embodiment, the guard 20 material is one-eighth inch thick HDPE. For a larger guard, the thickness may be one-quarter inch thick HDPE. Other thicknesses may also be suitable.

In the embodiment shown, the guard 20 is made up of three sections. An angled section 22 is about 3 feet long and wide enough to fit over a strut 16. Each strut 16 may be formed of sheet steel bent at a 90° angle along its length (an L-beam) so that its top and side are each about 3 inches. Therefore, the angled section 22 of the guard may have a top inner dimension width of 3.25 inches to fit over the top of the strut 16, and its sides may be about 6-8 inches to completely cover the sides of the strut 16 and still allow room below the strut 16 for passing a bolt 23 and a snap pin 24 through the sides to prevent the guard 20 from blowing off in a high wind.

Figure 4:
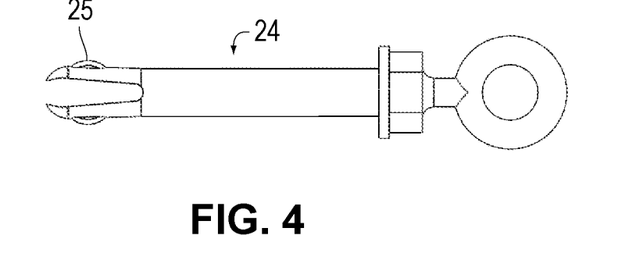
FIG. 4 is a side view of a snap pin used near the bottom of the guard to affix the guard to the angled strut.

FIG. 4 shows a plastic snap pin 24 that is easily inserted through holes on both sides of the guard 20 after the lineman positions the guard 20 over the upper portion of the angled strut 16 while the lineman is supported on the center body of the tower 10 far from the insulator 12 (FIG. 1). The end 25 of the snap pin 24 resiliently expands after the snap pin 24 is completely inserted through the guard 20. The lineman than just pushes the guard 20 toward the end of the angled strut 16 until the guard is stopped by the horizontal strut 18. At this time, the lineman inserts a standard metal bolt 23 through the upper holes in the guard 20 and tightens the bolt 23 with a hex nut and lock washer to bring the sides of the guard 20 closer to crimp the guard 20 tightly to the angled strut 16 so it cannot move in position during a high wind. The bolt 23 can be made of metal since it is far from the wires. Other means for affixing the guard 20 to the strut 16 may also be used, such as clamps, clips, friction, the guard snapping around the strut, etc.

A bottom section 26 of the guard 20 is connected to the angled section 22 either integrally or via a middle section 28. The middle section 28 may be connected to the other sections by gluing or heat staking. The bottom section 26 overlies the portion of the tower where the strut 16 is connected and overlies the steel connector 30 that pivotally connects the ceramic insulator 12 to the tower, so a bird cannot perch directly on any grounded metal near the ceramic insulator 12. The side edges of the bottom section 26 are bent downward to cover the sides of the steel horizontal strut 18, add rigidity, and prevent a rain-water path from the top of the guard 20 to a grounded portion via capillary action.

The guard 20 provides a relatively long surface path between a bird perching on it and the grounded steel to prevent an electrical path being created by surface conduction. The starting plastic sheet prior to bending can be substantially rectangular, so the surface distance between a top surface of the guard 20 and the underlying grounded metal would be the same along the entire length of the guide 20.

The middle section 28 acts as an interface between the sections 22 and 26 and creates a long surface path to ground if a bird perches on it, equal to the surface paths of the other two sections, so there are no "weak" points along the guide 20. The middle section 28 may be glued or heat staked to the sections 22 and 26. The middle section 28 need not be bent as shown in FIG. 3, but may be a straight wide piece.

The middle section 28 may be somewhat flexible so the angle between the sections 22 and 26 is variable to adapt to a range of angles where the strut 16 meets the horizontal strut 18.

The minimum distance between the wire 14 and the angled strut 16 is typically about 3 feet, which occurs when very strong wind has blown the ceramic insulator 12 and wire 14 toward the strut 16 so that the ceramic insulator 12 is about perpendicular to the strut 16. A strut 16 is typically about six feet long, and the guard 20 should extend at least half-way up the strut 16. In one embodiment, the angled portion of the guard 20 is about four feet long.

The required insulating characteristics of the guide 20, including material, thickness, surface distance to ground, etc., may be found in existing publications published by IEEE, or the material manufacturer, or other sources. The National Electrical Safety Code identifies required distances between out-of-phase wires and between wires and ground for various voltages.

The guard 20 will be typically used on steel towers supporting multiple tiers of wires carrying voltages of 50 kV or more. However, the guard 20 can be used to cover grounded struts on cement or wooden structures, and minor modifications, if necessary, can easily be made to accommodate various types of struts.

Figure 5:
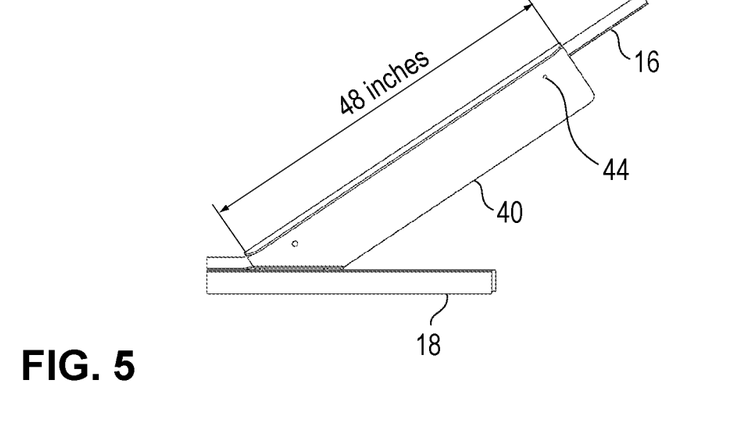
FIGS. 5-8 illustrate various views of another insulating guard embodiment for attachment over a grounded angled strut of a structure supporting a high voltage wire.
Figure 6:
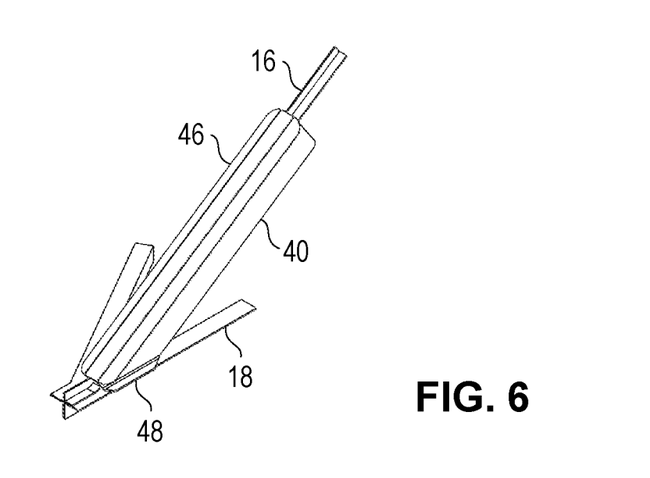

FIGS. 5-8 illustrate a different embodiment of a plastic (e.g., HDPE) guard 40 for attachment to a grounded strut of a structure. In FIGS. 5 and 6, an angled strut 16 and horizontal strut 18 are shown. The struts may be the same as in FIG. 1, where the horizontal strut 18 supports a ceramic insulator supporting a high voltage wire. The guard 40 is affixed to the strut via bolts and pins through holes 44, as discussed with respect to FIG. 4.

Figure 7:
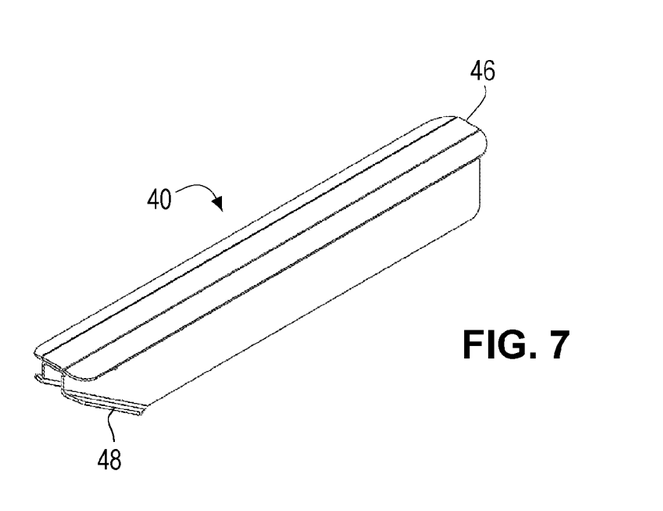
Figure 8:
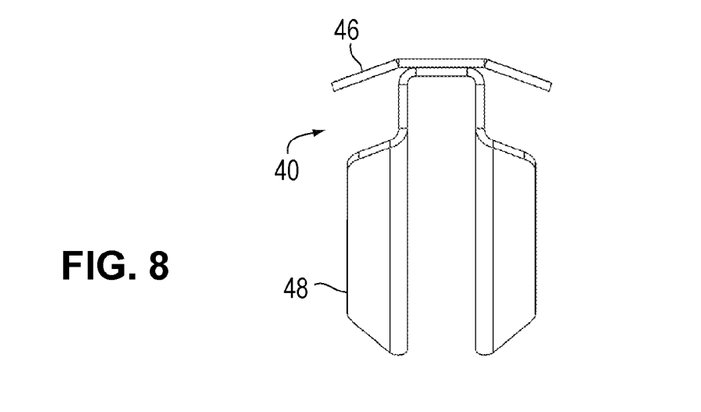

As best shown in FIGS. 7 and 8, where FIG. 8 is an end view, the guard 40 has a wider top portion 46 that is sufficiently wide so that a large bird's talons can not grab onto both edges of the top portion 46 simultaneously. The width of the top portion 46 may be six inches or more. This overhang also adds to the surface distance to ground. The overhanging top portion 46 also prevents water from creating a current path between the top surface and the strut. The top portion 46 may be a separate plastic piece that is glued or heat staked onto the body of the guard 40. In one embodiment, the guard 40 is about four feet long.

The guard 40 also includes a flared bottom portion 48 that is intended to be parallel with the horizontal strut 18 to prevent a bird from alighting on the strut at the base of the guard 40.

The guard 40 is easier to manufacture than the guard 20 of FIG. 3.

Figure 9:
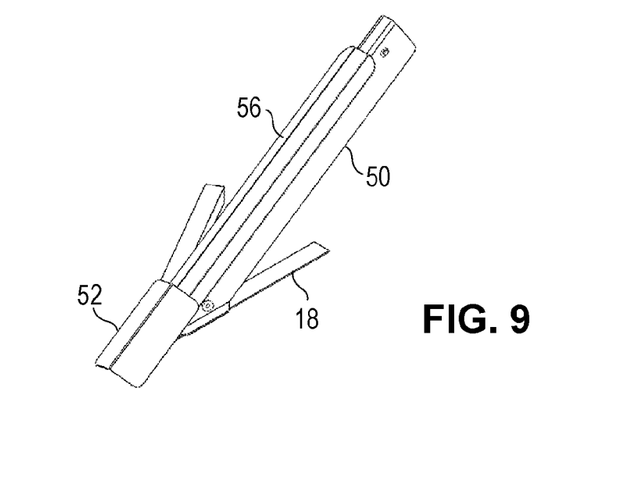
FIGS. 9-11 illustrate various views of yet another insulating guard embodiment for attachment over a grounded angled strut of a structure supporting a high voltage wire.
Figure 10:
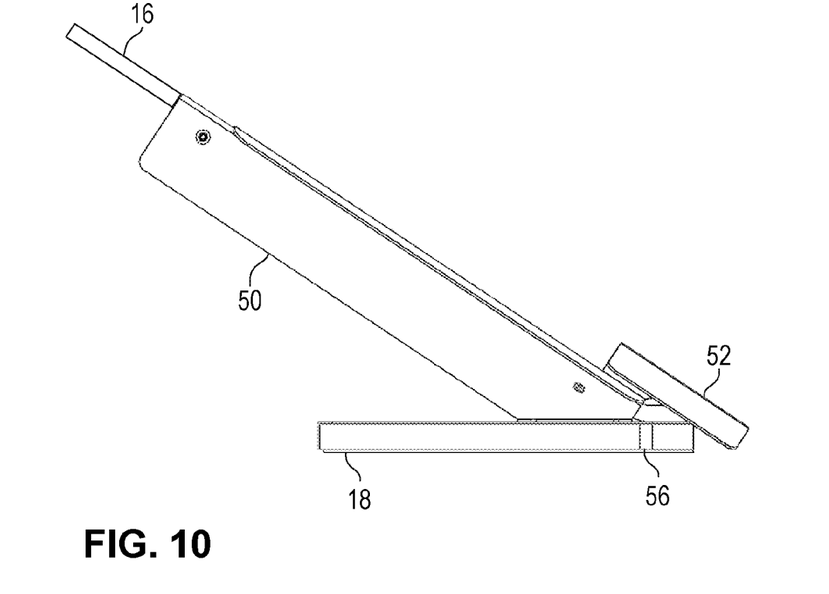
Figure 11:
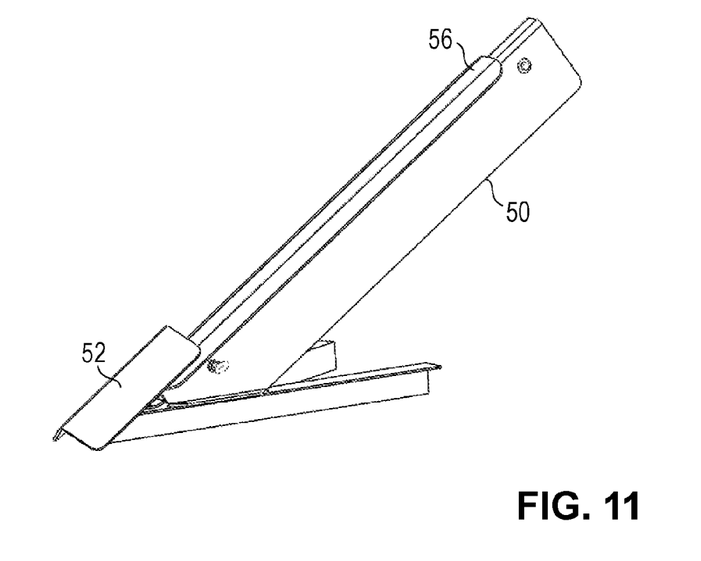

FIGS. 9-11 illustrate a guard 50, similar to guard 40, but having a raised angled shield 52 at the base to prevent birds alighting on the horizontal strut 18 near the ceramic insulator. The angled shield 52 may be six inches wide, or wider than the top portion 54, and pitched like a roof to deter birds from landing on it. The angled shield 52 is shown in FIG. 10 extending beyond the end of the horizontal strut 18 to ensure a bird cannot alight at the end of the strut 18. The angled shield 52 is raised above the top portion 54 of the upper part of the guard 50 to enable the angled shield 52 to extend over the end of the horizontal strut 18. FIG. 10 illustrates that the horizontal strut 18 includes a hole 56 for a bolt supporting a ceramic insulator. The angled shield 52 covers the bolt and the ceramic insulator.

The wide top portion 54 is similar to the top portion 46 of the guard 40 in FIG. 7.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is claimed is:

1. An electrical system for preventing flashover between a bird and a high voltage wire by the bird bridging an air gap between a grounded transmission structure and the wire, the system comprising:

an electrically insulating guard affixed to a grounded first metal strut of the structure, the first metal strut supporting a first insulator that, in turn, supports a first wire carrying a voltage, the structure supporting a plurality of wires, the guard covering at least a top surface of the first metal strut proximate to the first insulator, an inner surface of the guard having a generally U-shape, the guard having a top surface and generally opposing side surfaces, the top surface facing upward and edges of the side surfaces generally facing downward, a distance between the side surfaces being greater than a width of the first metal strut to allow the guard to be positioned over the first metal strut, wherein the edges of the side surfaces extend substantially equal distances below the bottom of the first metal strut to provide an extended flashover distance between any bird landing on the top surface of the guard and the first metal strut;

the guard having a securing device attaching the guard to the first metal strut, wherein the securing device comprises a blocking mechanism extending between the two sides and below the first metal strut that prevents the U-shaped guard from being lifted off the first metal strut, the guard being configured to prevent a bird that has landed on the guard from being grounded by the structure to prevent flashover between one of the plurality of wires supported by the structure and the bird.

2. The system of claim 1 wherein the structure comprises a plurality of angled metal struts, each supporting an insulator connected to a high voltage wire, wherein the first metal strut is below a second metal strut supporting a second insulator that, in turn, supports a second wire, the guard for preventing a bird that has landed on the guard from being grounded by the structure to prevent flashover between the first metal strut and the second wire.

3. The system of claim 1 wherein the guard comprises a plastic.

4. The system of claim 1 wherein the guard covers at least one-third of a length of the first metal strut.

5. The system of claim 1 wherein the securing device comprises at least one bolt extending through sides of the guard for securing the guard to the first metal strut.

6. The system of claim 1 wherein the guard is substantially rectangular.

7. The system of claim 1 wherein the guard comprises three sections, a first section being an angled section covering the top surface of the first metal strut spaced away from the first insulator, a second section being a substantially horizontal section overlying the first insulator, and a third section covering an area between the first section and the second section.

8. The system of claim 7 wherein the third section comprises a plate having a substantially horizontal portion and an angled portion.

9. The system of claim 7 wherein the first portion and the second portion have downward facing sides extending over sides of the first metal strut.

10. The system of claim 1 wherein the guard has downward facing sides extending over sides of the first metal strut.

11. The system of claim 1 wherein the guard comprises a shield portion overlying the first insulator, the shield portion being wider than a portion of the guard spaced from the first insulator by a first distance.

12. The system of claim 1 wherein the first metal strut comprises an angled strut portion and a horizontal strut portion, the horizontal strut portion being attached to the first insulator, the guard comprising an angled guard portion covering the angled strut portion and a horizontal guard portion covering the horizontal strut portion, wherein the horizontal guard portion is wider than the angled guard portion.

13. The system of claim 1 wherein the guard further comprises a top shield portion overhanging downward facing side portions of the guard.

14. The system of claim 1 wherein the structure comprises a steel tower.

15. The system of claim 1 wherein the structure comprises a cement structure.

16. The system of claim 1 wherein the structure comprises a wooden structure.

17. The system of claim 1 wherein the guard covers an area of the first metal strut overlying the first insulator as well as an area of the first metal strut spaced from the first insulator.

18. The system of claim 1 wherein the guard is at least two feet long.

* * * * *